US008013779B2

(12) United States Patent
Maurel et al.

(10) Patent No.: US 8,013,779 B2
(45) Date of Patent: Sep. 6, 2011

(54) AIRBORNE RADAR NOTABLY FOR A DRONE

(75) Inventors: Dominique Maurel, Montrouge (FR); Patrick Lacroix, Boulogne (FR); René Ramolet, Elancourt (FR)

(73) Assignee: Thales (FR)

( * ) Notice: Subject to any disclaimer, the term of this patent is extended or adjusted under 35 U.S.C. 154(b) by 594 days.

(21) Appl. No.: 12/030,651

(22) Filed: Feb. 13, 2008

(65) Prior Publication Data
US 2010/0045544 A1    Feb. 25, 2010

(30) Foreign Application Priority Data
Feb. 13, 2007 (FR) ..................... 07 01031

(51) Int. Cl.
G01S 13/00        (2006.01)
(52) U.S. Cl. .............................. 342/27; 342/25; 343/705
(58) Field of Classification Search .............. 343/766, 343/765, 705, 872; 342/27
See application file for complete search history.

(56) References Cited

U.S. PATENT DOCUMENTS

| | | | |
|---|---|---|---|
| 3,069,112 A | 12/1962 | Patterson | |
| 3,314,070 A | 4/1967 | Youngren | |
| 5,025,262 A * | 6/1991 | Abdelrazik et al. | 343/705 |
| 5,451,970 A * | 9/1995 | Cole | 343/786 |
| 5,969,686 A * | 10/1999 | Mackenzie | 343/705 |
| 6,484,619 B1 * | 11/2002 | Thomas et al. | 89/41.07 |
| 6,987,492 B1 | 1/2006 | Buchanan et al. | |
| 7,136,726 B2 * | 11/2006 | Greenfeld et al. | 701/3 |

FOREIGN PATENT DOCUMENTS
EP    0 735 607 A1    10/1996
* cited by examiner

Primary Examiner — Jacob Y Choi
Assistant Examiner — Kyana R Robinson
(74) Attorney, Agent, or Firm — Lowe Hauptman Ham & Berner, LLP

(57) ABSTRACT

The present disclosure relates to an airborne radar notably for a drone. In at least one embodiment, the airborne radar has a first structure and a second structure. The first structure is mechanically attached to an aircraft carrying the radar. The first structure has a degree of rotational freedom relative to the aircraft on a first axis. The second structure is attached to the first structure. The second structure has a degree of rotational freedom relative to the first structure on a second axis converging with the first axis. An antenna is attached to the second structure and configured to receive and send electromagnetic waves. An electronic module configured to process the electromagnetic waves sent or received by the antenna is attached to the second structure.

17 Claims, 3 Drawing Sheets

AIRBORNE RADAR NOTABLY FOR A DRONE

RELATED APPLICATIONS

The present application is based on, and claims priority from, French Application Number 07 01031, filed Feb. 13, 2007, the disclosure of which is hereby incorporated by reference herein in its entirety.

BACKGROUND OF THE INVENTION

The present invention relates to an airborne radar notably for a drone. This invention finds its main application in the field of tactical drones.

DESCRIPTION OF THE PRIOR ART

Tactical drones operate in medium altitude layers lying between 4000 and 5000 meters. This type of drone may notably be used for territory mapping purposes. Tactical drones may, therefore, carry a SAR radar, or Synthetic Aperture Radar. Tactical drones also find their application in territory surveillance missions notably by carrying a radar of the GMTI, or Ground Moving Target Indicator, type.

Tactical drones may notably be transported to a theater of theater of operations. For this purpose, it is important to optimize the volume and weight of the onboard systems. This makes it possible on the one hand to make the drones easier to transport and operate, and on the other hand to increase their range in flight by taking on notably the most fuel possible.

On the other hand, when landing, tactical drones sustain relatively violent impacts notably due to an environment that is not always suitable for the landing of an aircraft. The radars usually situated beneath the belly of the drone are badly damaged if there is a bad landing.

Currently, the onboard radar devices on drones have a fixed structure of the cylindrical type situated on the belly portion of the drone. The fixed structure consists of a radome made of composite materials. This structure is, by construction, relatively fragile and costly to replace if damaged. The radar antenna is carried by a movable structure situated notably inside the radome. This type of radar device is particularly bulky.

Usually other components of the radar such as electronic circuit boards necessary for processing a radar signal transmitted or received by the antenna and analog circuit boards, an electric power supply and a power transmitter are positioned inside the drone for example or in the top portion of the radome, the bottom portion being dedicated to the antenna. Therefore the movable antenna is connected to the other components of the radar via a wired structure notably based on rotating seals. Since the power transmitter of the radar dissipates much heat, it is necessary to associate with it cooling means which are also in the radome. These cooling means may for example be fans mixing the air around the power transmitter and electronic circuit boards also dissipating heat.

All these elements lead to the use of onboard radars which, in addition to not being very robust, are bulky and heavy.

SUMMARY OF THE INVENTION

One object of the invention is notably to remedy the aforementioned disadvantages. Accordingly the subject of the invention is an airborne radar comprising notably:
- a first structure, mechanically attached to an aircraft carrying the radar, having a degree of rotational freedom relative to the aircraft on a first axis;
- a second structure, mechanically attached to the first structure, having a degree of rotational freedom relative to the first structure on a second axis converging with the first axis;
- an antenna for receiving and sending electromagnetic waves, said antenna being attached to the second structure;
- an electronic module processing the electromagnetic waves sent or received by the antenna, said electronic module being attached to the second structure.

The first axis is for example perpendicular to the second axis.

The outer skin of the second structure comprises notably a porthole radome situated facing the antenna.

The radar according to the invention also comprises a power transmitter situated on the second structure, in mechanical contact with the outer skin of the second structure.

The outer skin of the second structure may comprise fins in mechanical contact with the power transmitter.

The outer skin of the second structure may also comprise a reinforced portion situated facing the electronic module.

The first structure may for example be cylindrical in shape.

The second structure may, in a first embodiment, be spherical in shape.

The second structure may, in another embodiment, be cylindrical in shape.

The main advantages of the radar according to the invention are notably that it is robust and makes it possible to optimize the production and maintenance costs of the radar.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF A PREFERRED EMBODIMENT

Figure 1:
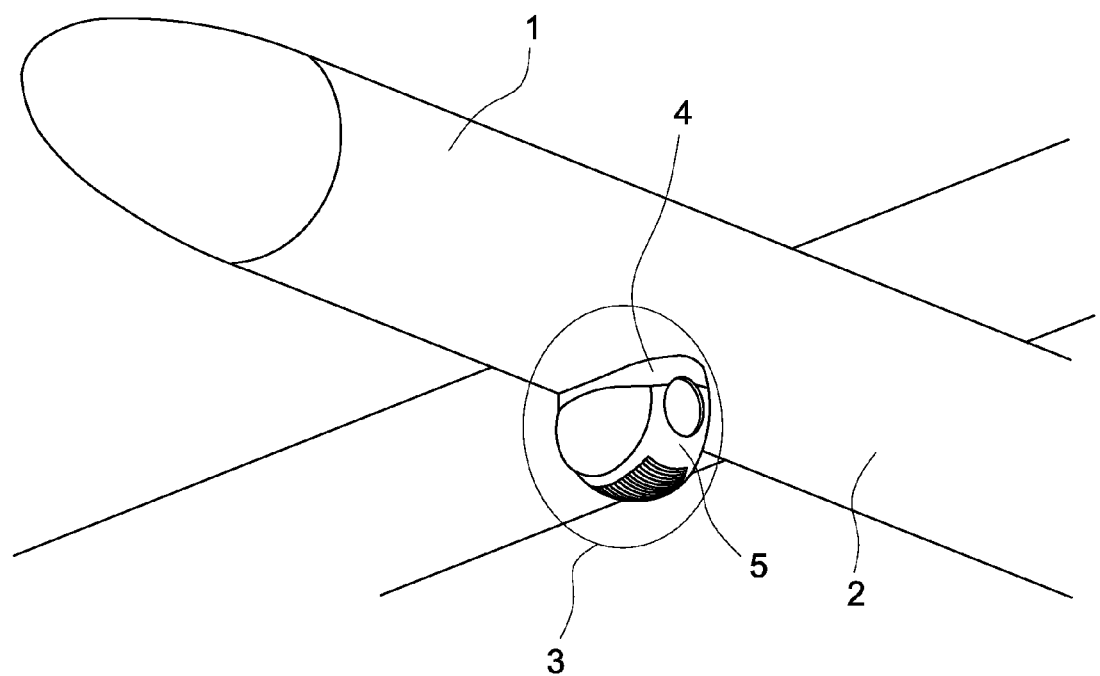
FIG. 1: an exemplary radar according to the invention, airborne by a drone.

FIG. 1 represents an exemplary tactical drone 1 fitted with a radar 3 according to the invention. The radar 3 is attached to the belly portion 2 of the drone 1. The outer structure of the radar 3 consists of a first structure 4, for example cylindrical in shape, attached to the outer structure of the drone 1, and a second structure 5, in the shape of a portion of a sphere, attached to the first cylindrical structure 4. The outer structure of the radar 3 therefore has a particularly aerodynamic teardrop shape. The shape of the radar structure 3 allows the drone 1 to have an optimal aerodynamic drag associated with the presence of the radar 3.

Figure 2A:
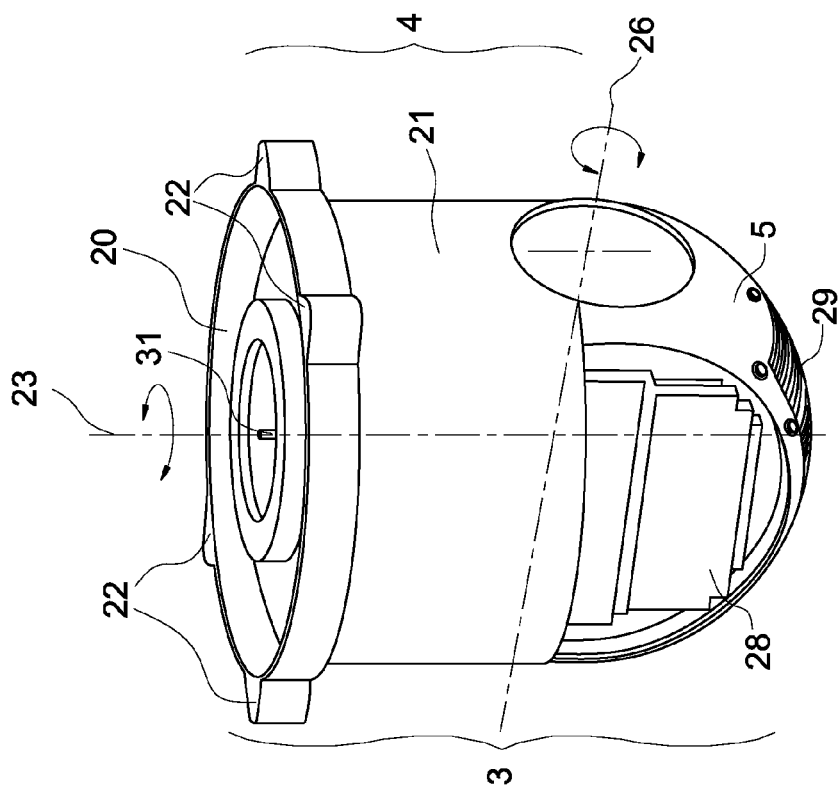
FIG. 2a: an exemplary structure in elevation of the radar according to the invention.
Figure 2B:
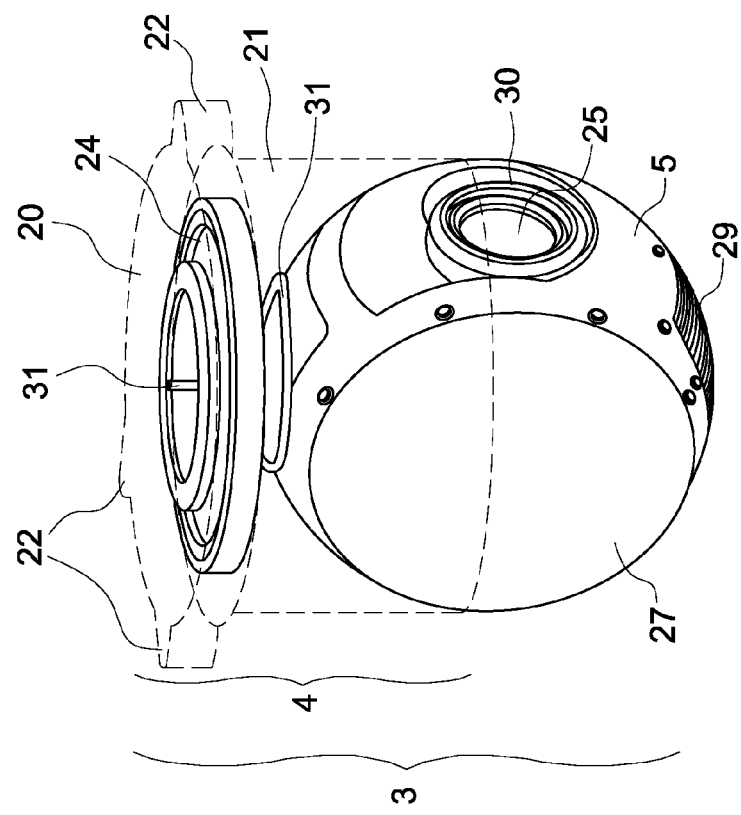
FIG. 2b: an exemplary circular structure of the radar according to the invention.

FIGS. 2a and 2b represent an exemplary embodiment of a radar 3 according to the invention. The first cylindrical structure 4 comprises notably two portions 20, 21 attached to one another. The first portion 20 is attached to the drone 1. It may have the shape of a crown 20 having protruding ears 22. The ears 22, which may be four in number for example, make it possible notably to attach the radar 3 by means of screws to the drone 1. The second portion 21 is for example a hollow movable cylinder 21 having a degree of rotational freedom relative to the crown 20. The cylinder 21 is in rotation about a first axis 23. The first axis 23, called the circular axis 23, passes notably through the center of the crown 20 and of the cylinder 21. The circular axis 23 is called the carrier axis because it carries all the rotating portions of the radar 3. The rotary movement of the cylinder 21 may be provided by a first torque motor 24 of annular shape situated for example inside the crown 20. The first motor 24 comprises a stator and a rotor not shown in FIGS. 2a and 2b. The stator of the first motor 24 is for example attached to the fixed crown 20 and the rotor of the first motor 24 is then attached to the movable cylinder 21.

A shaft 25, for example cylindrical, is connected at each of its ends to the inner edges of the cylinder 21. The cylindrical shaft 25 is oriented on a second axis 26, called the elevation axis 26 because it makes it possible to orient the radar 3 in elevation. The elevation axis 26 is therefore an axis supported by the cylindrical structure 4. The elevation axis 26 is notably perpendicular to the circular axis 23. The circular axis 23 and the elevation axis 26 converge.

The second spherical structure 5 can be moved in rotation about the elevation axis 26; accordingly the spherical structure 5 is called the elevation structure 5. The elevation structure 5 is partly inside the cylinder 21. The elevation structure 5 may also have, in another embodiment, the shape of a cylinder whose central axis may be the elevation axis 26. A second torque motor 30, for example of annular shape, allows the elevation structure 5 to rotate about the elevation axis 26. The second motor 30 may comprise a stator and a rotor not shown in FIGS. 2a and 2b. The stator of the second motor 30 is for example attached to the cylindrical shaft 25 and the rotor of the second motor 30 is attached to the elevation structure 5.

The elevation structure 5 comprises, notably as an outer skin, a porthole radome 27. The porthole radome 27 is a portion of a sphere made in a composite material that is permeable to electromagnetic waves. A radome is usually placed in front of a radar antenna. FIG. 2b shows notably the elevation structure 5 without the porthole radome 27. The porthole radome 27 is positioned on the elevation structure 5 in front of an antenna 28 of the radar 3. The antenna 28 is mechanically attached to the elevation structure 5. The porthole radome 27 may be attached to the elevation structure 5 by means of screws for example, so as to be easily removable for access notably to the antenna 28. On the radar 3 according to the invention, the porthole radome 27 therefore does not cover the whole of the outer structure of the radar 3.

The elevation structure 5 may rotate 360 degrees about the elevation axis 26. This notably makes it possible to place the porthole radome 27 inside the cylinder 21 in order to protect it against possible damage that may be due for example to a rough landing. The elevation structure 5 may also comprise as an outer skin, on the other side of the porthole radome 27 relative to the center of the elevation structure 5, a reinforced removable cover, not shown in FIGS. 2a and 2b. This cover makes it possible to provide increased protection against impacts when the porthole radome 27 is oriented toward the inside of the cylinder 21.

The elevation structure 5 also comprises a surface consisting of fins 29 which facilitate heat exchanges between the inside of the elevation structure 5 and the ambient air outside the radar 3.

Between the elevation structure 5 and the cylindrical structure 4 there is notably a rotating cable 31 which makes it possible to connect the equipment situated inside the elevation structure 5 to the body of the drone 1. The rotating cable 31 consists of various cables making it possible notably to provide a power supply current to the various items of equipment of the radar 3. The rotating cable 31 also allows transmission of the digital commands of the various items of equipment and two motors 24, 30 of the radar 3.

Figure 3:
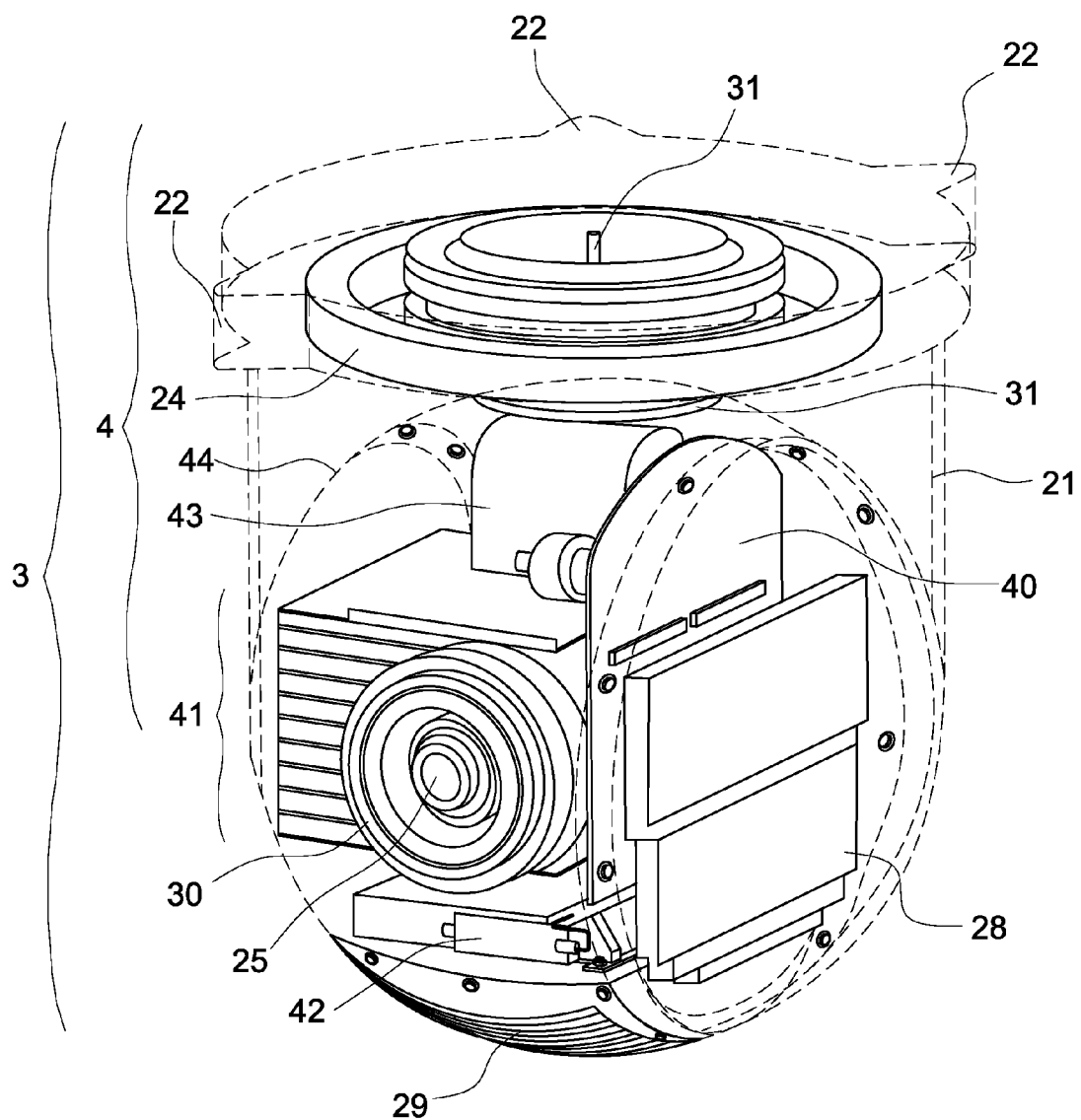
FIG. 3: an exemplary disposition of various components of the radar in the structure in elevation of the radar according to the invention.

FIG. 3 represents a view of components inside the radar 3 according to the invention. FIG. 3 therefore shows an exemplary disposition of the main components of the radar 3 situated inside the elevation structure 5.

Behind the antenna 28 is an electronic module comprising notably an electronic motherboard 40 making it possible to interconnect electronic daughterboards 41 also forming part of the electronic module of the radar 3. The daughterboards 41 are for example situated behind the motherboard 40. Notably they allow the transmit and receive processing of the radar signals. The daughterboards 41 are for example positioned perpendicularly to the antenna, one above the other. A removable cover 44, situated on the other side of the porthole radome 27 as an outer skin of the elevation structure 5, makes access to the electronic daughterboards 41 easier. A power transmitter 42 of the radar 3 is positioned inside the spherical structure 5 in contact with the fins 29. This allows the heat, diffused by the power transmitter 42 in operation, to dissipate. The power transmitter 42 is therefore advantageously cooled by the outside air.

In FIG. 3, an inertial unit 43 is also shown. The inertial unit 43 notably makes it possible to provide the position of the radar 3 to the various items of equipment of the drone 1.

The various components 28, 40, 41, 42, 43, of the radar 3 are placed inside the spherical structure 5 so that their center of gravity is at the intersection of the circular axis 23 and elevation axis 26. This makes it possible to balance the weight of the radar in order to make the rotations of the elevation structure 5 and the cylindrical structure 4 easier. This may also make it possible to prevent the addition of supplementary inertial weights to balance the radar 3 according to the invention.

The structure of the radar 3 according to the invention advantageously makes it possible to minimize the weight of the onboard radar 3 by dispensing notably with the fans and inertial weights usually employed in this type of device.

The radar 3 according to the invention also has the advantage of having an optimized volume notably facilitating the transport and handling of a drone fitted with such a radar 3.

The volume advantageously cleared inside the drone 1, formerly occupied by items of equipment such as the fans or the electronic circuit boards, may make it possible to load a greater quantity of fuel in order to gain in flight range.

Advantageously, the structure of the radar 3 according to the invention has good aerodynamics therefore allowing the drone to limit additional fuel consumption associated with the presence of the radar 3. This also makes it possible to increase the range in flight of the drone 1 relative to a drone fitted with a conventional radar.

Another advantage of the radar 3 according to the invention is that it is robust: its structure advantageously makes it possible to protect fragile surfaces such as the porthole radome 27 and to expose reinforced surfaces such as the cover 44.

The structure of the radar 3 according to the invention advantageously has a minimal production cost. Specifically, the radome made of composite materials is relatively costly to produce. The radar 3 according to the invention therefore advantageously uses a porthole radome 27 of reduced size. In addition, the porthole radome 27 being a portion of a sphere, a blank in the shape of a sphere made of composite materials makes it possible to produce several porthole radomes 27. This advantageously makes it possible to reduce the production cost per unit of the porthole radome 27.

Advantageously, the structure of the radar 3 according to the invention makes it possible to reduce the maintenance costs of the radar 3: the various components of the radar 3 can be easily accessed and removed by removing either the porthole radome 27 or the cover 44. Advantageously, this allows a faulty part to be replaced without removing the whole radar 3.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. An airborne radar comprising:
a first structure, mechanically attached to an aircraft carrying the radar, having a degree of rotational freedom relative to the aircraft on a first axis;
a second structure, mechanically attached to the first structure, having a degree of rotational freedom relative to the first structure on a second axis converging with the first axis;
an antenna for receiving and sending electromagnetic waves, said antenna being attached to the second structure;
an electronic module processing the electromagnetic waves sent or received by the antenna, said electronic module being attached to the second structure; and
a power transmitter situated on the second structure, in mechanical contact with an outer skin of the second structure to facilitate heat exchange between the power transmitter and ambient air outside the airborne radar.

2. The radar as claimed in claim 1, wherein the first axis is perpendicular to the second axis.

3. The radar as claimed in claim 2, wherein the outer skin of the second structure comprises a porthole radome situated facing the antenna.

4. The radar as claimed in claim 2, wherein the outer skin of the second structure comprises a reinforced portion situated facing the electronic module.

5. The radar as claimed in claim 1, wherein the outer skin of the second structure comprises a porthole radome situated facing the antenna.

6. The radar as claimed in claim 5, wherein the outer skin of the second structure comprises a reinforced portion situated facing the electronic module.

7. The radar as claimed in claim 1, wherein the outer skin of the second structure comprises fins in mechanical contact with the power transmitter.

8. The radar as claimed in claim 7, wherein the outer skin of the second structure comprises a reinforced portion situated facing the electronic module.

9. The radar as claimed in claim 7, wherein the second structure is spherical in shape.

10. The radar as claimed in claim 1, wherein the outer skin of the second structure comprises a reinforced portion situated facing the electronic module.

11. The radar as claimed in claim 10, wherein the second structure is spherical in shape.

12. The radar as claimed in claim 1, wherein the first structure is cylindrical in shape.

13. The radar as claimed in claim 12, wherein the second structure is spherical in shape.

14. The radar as claimed in claim 1, wherein the second structure is spherical in shape.

15. The radar as claimed in claim 1, wherein the second structure is cylindrical in shape.

16. An airborne radar comprising:
a first structure rotatabaly attached to an aircraft carrying the radar, the first structure having a degree of rotational freedom relative to the aircraft on a first axis;
a second structure comprising a heat dissipation device and rotatabaly attached to the first structure, the second structure having a degree of rotational freedom relative to the first structure on a second axis converging with the first axis;
an antenna arranged for receiving and sending electromagnetic waves, the antenna being attached to the second structure;
an electronic module arranged for processing the electromagnetic waves sent or received by the antenna, the electronic module being attached to the second structure; and
a power transmitter situated on the second structure and coupled with the heat-dissipation device, the heat dissipation device comprising an outer skin of the second structure, and the power transmitter is in direct contact with the outer skin of the second structure.

17. The radar of claim 16, wherein the outer skin of the second structure comprises fins in direct contact with the power transmitter.

* * * * *